Oct. 21, 1958 M. CAMRAS 2,857,164

MAGNETIC RECORDER

Filed Aug. 1, 1951 6 Sheets-Sheet 1

Inventor
Marvin Camras
by Hill, Sherman, Meroni, Gross & Simpson Attys

Oct. 21, 1958 M. CAMRAS 2,857,164

MAGNETIC RECORDER

Filed Aug. 1, 1951 6 Sheets-Sheet 2

Inventor
Marvin Camras by Hill, Sherman, Meroni, Gross & Simpson Attys

Oct. 21, 1958 M. CAMRAS 2,857,164

MAGNETIC RECORDER

Filed Aug. 1, 1951 6 Sheets-Sheet 3

Inventor
Marvin Camras
by Hill, Sherman, Meroni, Gross & Simpson Attys

Oct. 21, 1958 M. CAMRAS 2,857,164

MAGNETIC RECORDER

Filed Aug. 1, 1951 6 Sheets-Sheet 4

Inventor
Marvin Camras
by Hill, Sherman, Meroni, Gross & Simpson Attys

Inventor
Marvin Camras
by Hill, Sherman, Meroni, Gross & Simpson Attys

MAGNETIC RECORDER

Filed Aug. 1, 1951 6 Sheets-Sheet 6

Inventor
Marvin Camras
by Hill, Sherman, Meroni, Gross & Simpson Attys.

United States Patent Office
2,857,164
Patented Oct. 21, 1958

2,857,164

MAGNETIC RECORDER

Marvin Camras, Chicago, Ill., assignor to Armour Research Foundation of Illinois Institute of Technology, Chicago, Ill., a corporation of Illinois Application August 1, 1951, Serial No. 239,817
9 Claims. (Cl. 274—4)

The present invention relates to an improved magnetic recording and reproducing assembly.

The present invention is concerned with a magnetic recorder including an improved type of magazine for containing an elongated magnetic recording tape. In the past, various types of magazine units, usually containing a supply reel and a take-up reel, and guide rollers for guiding the tape in its travel from the supply reel to the take-up reel past an electromagnetic head have been employed. In such units, motive power for driving the supply reel and the take-up reel is supplied by coupling the spindles upon which the reels of the magazine are mounted to driven shafts extending from the magnetic recorder housing. While such magazines function efficiently, the magazine units themselves are relatively expensive because of the necessity of providing drive rollers and spool assemblies, and in some cases, the head itself.

The present invention is directed toward a new type of magnetic recording and reproducing apparatus arranged for use with an extremely simple, inexpensive magazine unit consisting primarily of a receptacle and a coil of a magnetic recording medium in the form of an endless loop. The electro-magnetic play-back head for reproducing the intelligence contained on the recording medium is contained on the magnetic reproducing assembly proper and not in the magazine unit. Similarly, a driving capstan and idler rollers which direct the magnetic tape toward and away from the head in the reproducing operation are located on the magnetic reproducing assembly, and are arranged to engage the tape within the enclosure defined by the magazine unit.

One of the outstanding features of the magazine unit of the present invention is the relatively small size for a given length of recording. This feature is accomplished by making the magnetic recording medium in the form of an endless loop having a plurality of spaced recorded channels thereon. In this way, the need for a rewinding mechanism is eliminated. If desired, a plurality of recorded channels on a given tape member may be different musical selections altogether, or the plurality of channels may be integrated into a single, relatively long musical selection. To accomplish playing of the plurality of channels without interruption, the record member of the present invention is provided with specially designed recorded transfer or transition tracks which connect the end of one channel to the beginning of the next. In order to shift the position of the playback head of the recording assembly from one channel to the next channel without interruption of the playback operation, means are provided on the record member itself which coact with a switch mechanism in the recorder assembly to move the electromagnetic reproducing head from one channel to the next along the magnetically recorded transfer track, thus making it possible to reproduce progressively all of the channels on the endless record member without interruption of reproduced intelligence, even when the electromagnetic reproducing head is being transferred from one channel to the next adjacent channel.

The magnetic recording assembly of the present invention has unique advantages over the conventional types of magnetic recording assemblies including those provided with a magazine unit, now in commercial use. A user need only provide himself with a single magnetic reproducing system of the type described, and can then start a collection of magnetically recorded selections. The magazine units themselves are simple in construction and economical. The magazine units have the further advantage that they can be conveniently stored in a small space.

An object of the present invention is to provide an improved magnetic reproducing assembly including a simple and inexpensive magazine unit containing a magnetic recording medium.

Another object of the present invention is to provide a magnetic reproducing assembly in which the magnetic reproducing head and the drive elements are associated with a main recorder assembly, and the magazine unit to be used with the magnetic reproducing assembly consists of a simple enclosure containing a coiled magnetic recording medium in the form of an endless loop.

Another object of the present invention is to provide a simplified magazine construction for magnetic reproducing assemblies.

Still another object of the present invention is to provide an improved magnetic recording and reproducing assembly with means for automatically adjusting the position of a magnetic transducer head from one recorded channel on a recording medium to another channel.

Another object of the present invention is to provide a novel type of magnetic recording medium having a plurality of spaced magnetically recorded tracks thereon, with angularly disposed magnetically recorded transfer tracks joining the end of one of the recorded channels to the beginning of the next recorded channel.

Another object of the present invention is to provide an inexpensive magnetic reproducing assembly for home use.

The novel features which I believe to be characteristic of my invention are set forth with particularity in the appended claims. My invention itself, however, both as to its manner of construction and method of control together with further objects and advantages may best be understood by reference to the following description, taken in connection with the accompanying drawings, in which:

As shown on the drawings.

Figure 1:
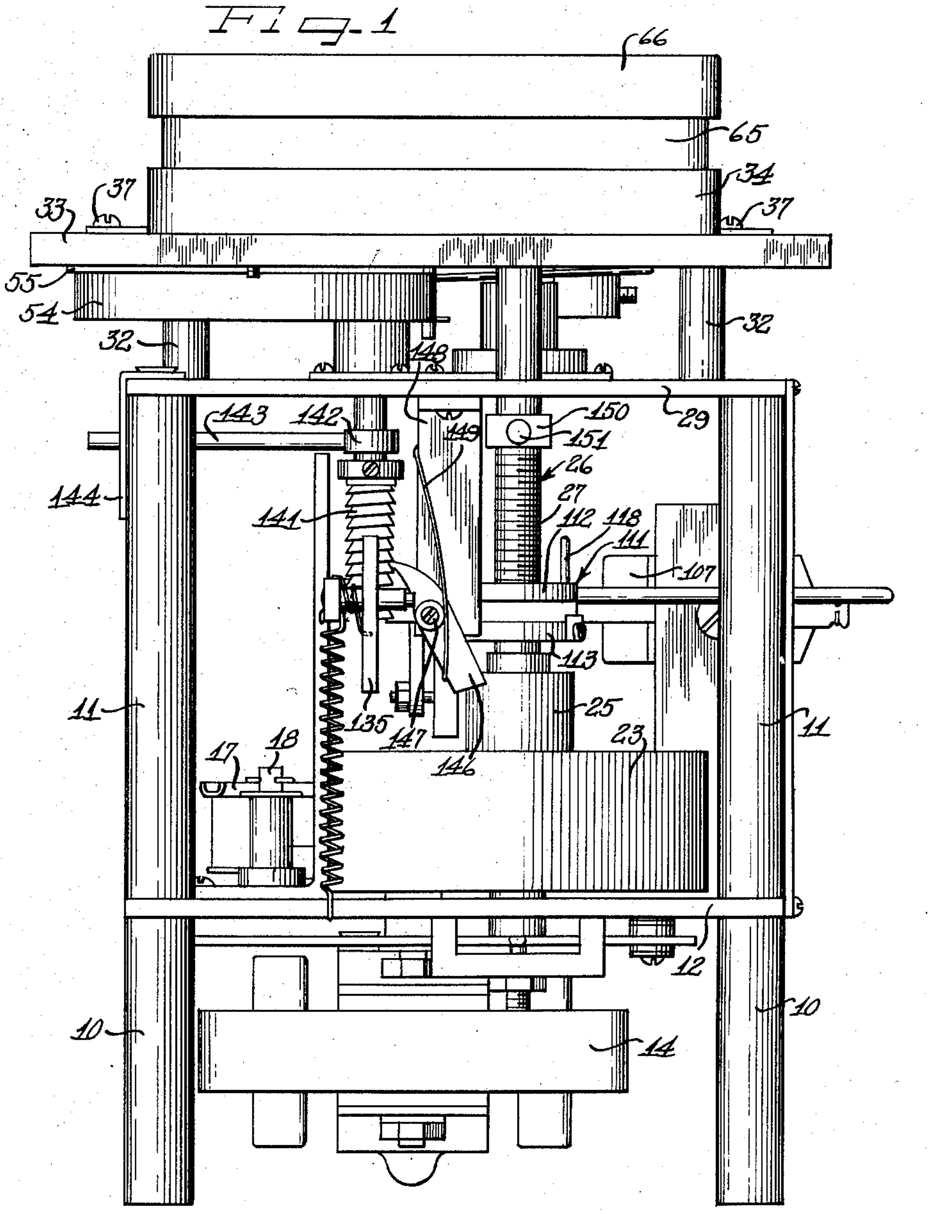
Figure 1 is a side elevational view, with parts in elevation of the recording assembly of the present invention, including the reproducing structure and the magazine unit attached thereto.
Figure 2:
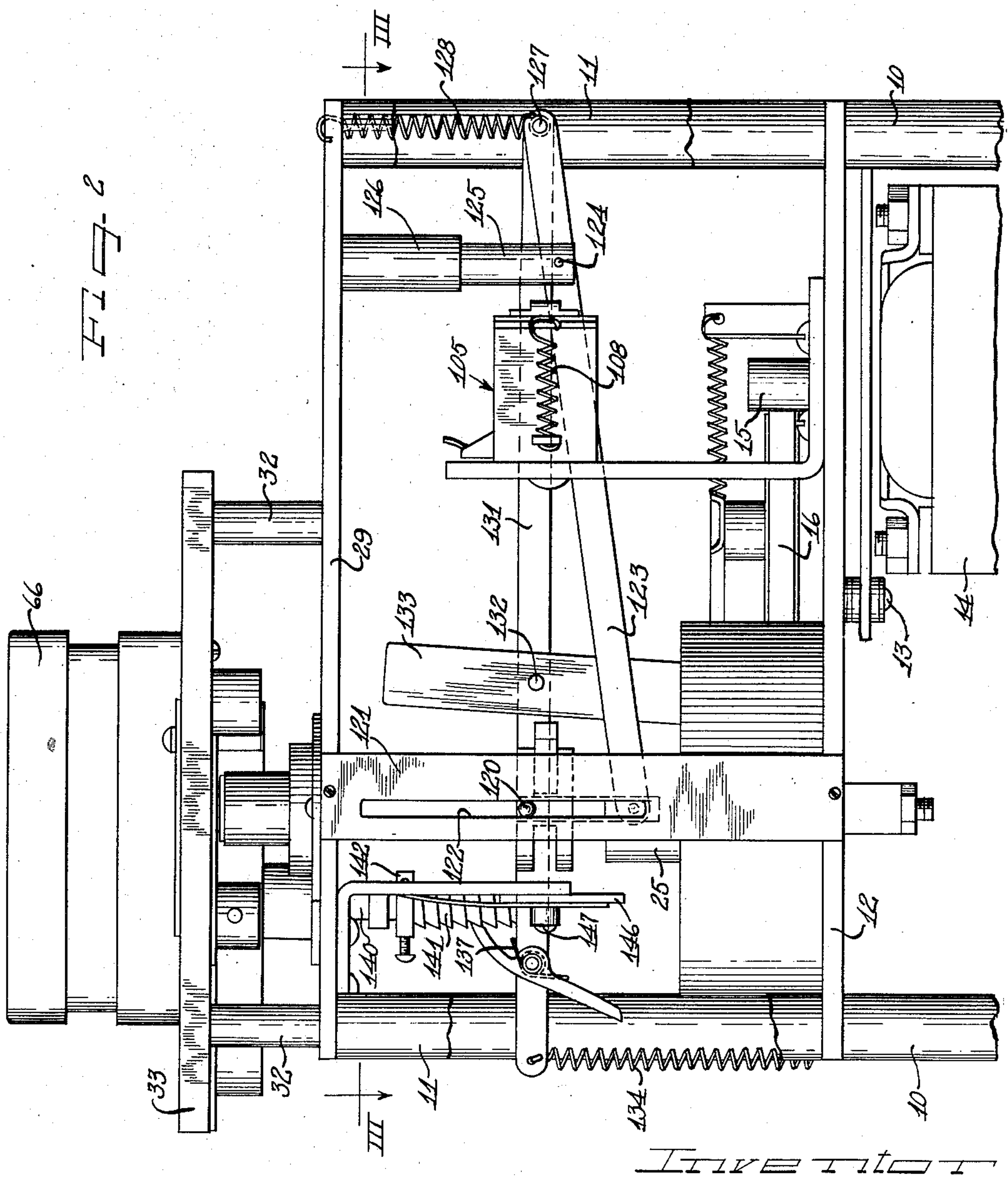
Figure 2 is a front elevational view of the assembly of Figure 1 with certain portions broken away to better illustrate the various components therein.
Figure 3:
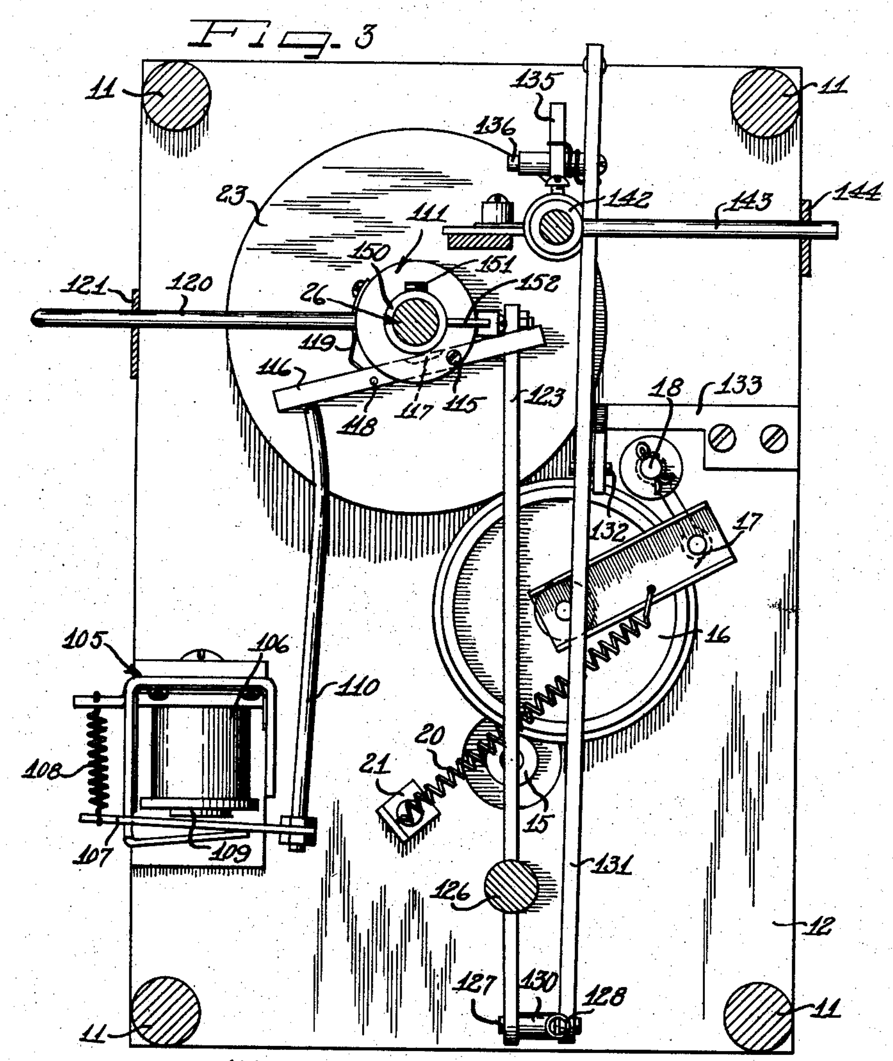
Figure 3 is a cross-sectional view taken substantially along the lines III—III of Figure 2.

The complete assembly of the present invention is best illustrated in Figures 1–3, inclusive. As shown in these drawings, the assembly consists of a frame structure including four oppositely disposed base legs 10 and supports 11 having their ends threadedly secured within threaded recesses in the upper ends of the base legs 10. Secured between the supports 11 and the base legs 10 is a platform 12. Suspended beneath the platform 12 by means of bolts 13 is a small electric motor 14 which supplies all the motive power for the magnetic recording apparatus. The motor 14 carries a stub shaft 15 which extends through a suitable aperture in the platform 12 to engage a rubber covered roller 16. This roller is suspended from a bracket 17 which is pivotally mounted about a pin 18 on the platform 12 (Fig. 1). A helical spring 20 having one end secured to the bracket 17 and the opposite end bottomed on a fixed bracket 21 biases the rubber covered surface of the roller 16 into good frictional engagement with the periphery of the stub shaft 15. The spring 20 also urges the rubber covered roller 16 into engagement with the periphery of a relatively massive flywheel stabilizer 23, the mass of the stabilizer 23 being sufficient to give the stabilizer a high degree of inertia so that the speed of the capstan associated with the stabilizer is not affected due to slight irregularities in the speed of rotation of the motor.

The rotary flywheel stabilizer 23 is secured by means of a annular collar 25 to a shaft 26 having a threaded portion 27 along its length. The shaft 26 extends through a suitable aperture in an upper platform 29 secured to the opposed support legs 11 and extends into the magazine subassembly to form a capstan member 30, the latter functioning to drive the magnetic record member past the recording head, as will hereinafter be explained.

*Magazine receiving unit*

The subassembly which engages the magazine unit, and the magazine unit itself will now be described. As shown in Figures 1 and 2, the subassembly includes a plurality of spaced support legs 32 which rigidly support the magazine base 33. Supported on the magazine base 33 is a magazine-receiving upstanding enclosure 34, the latter having extended marginal edges 35 and 36 secured to the magazine base 33 as by means of a pair of screws 37.

Figure 4:
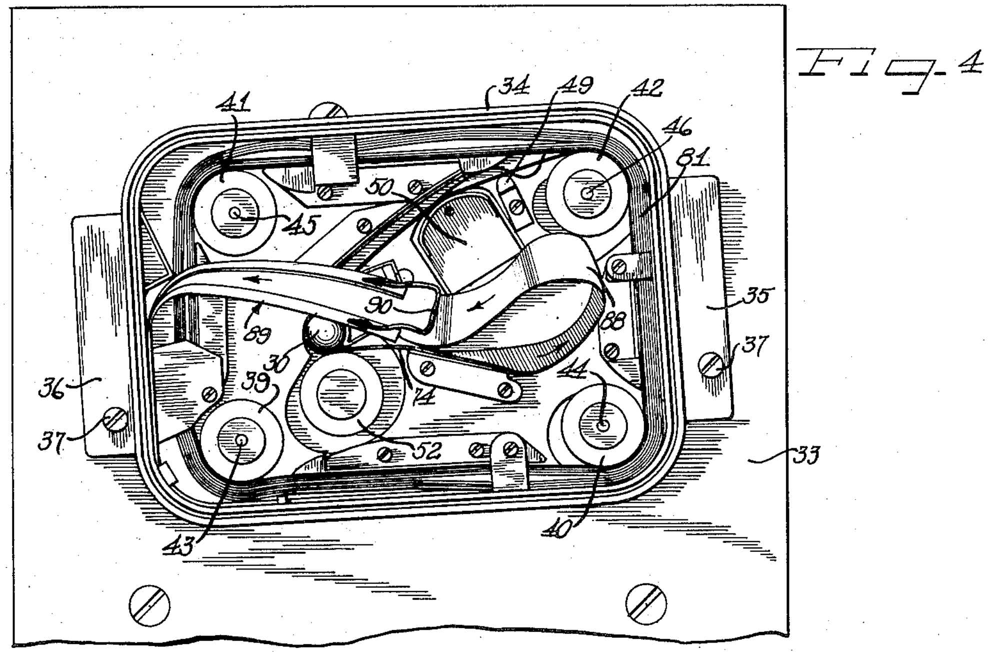
Figure 4 is a plan view of the assembly, with the cover of the magazine removed and the magazine in operative position on the recorder assembly.
Figure 5:
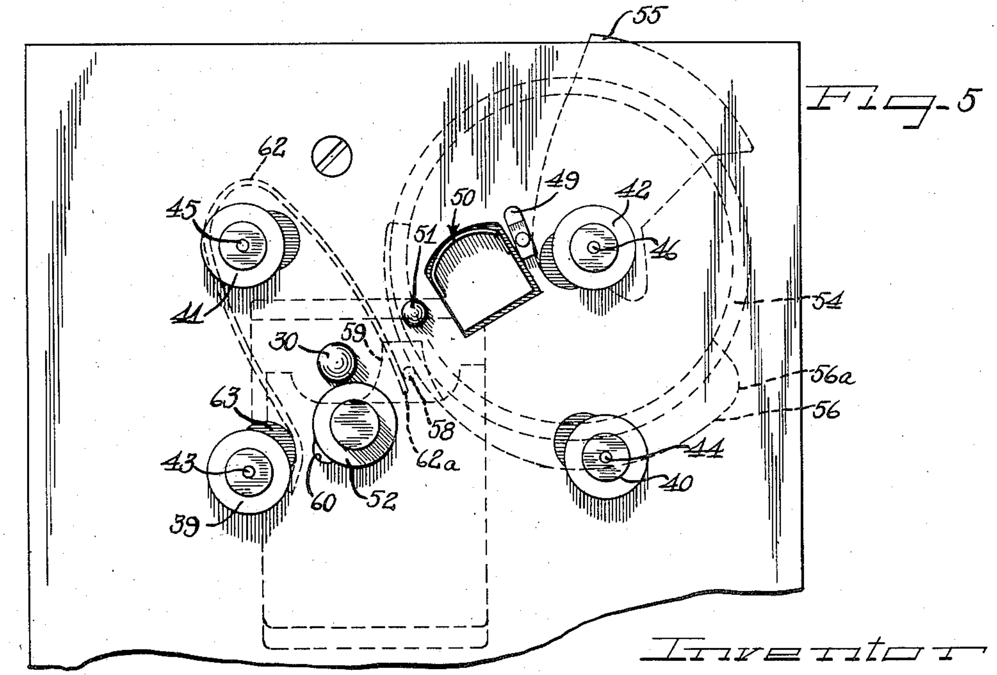
Figure 5 is a view similar to Figure 4, except with the magazine unit removed, showing the manner in which the elements of the magnetic reproducing assembly are engageable with the magnetic record medium in the magazine unit.
Figure 6:
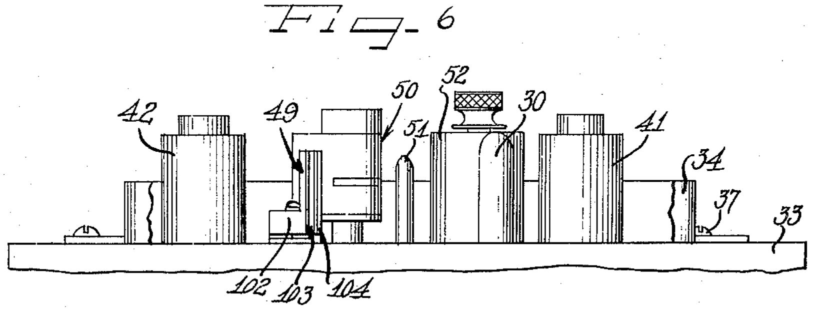
Figure 6 is a fragmentary elevational view of the portion of the magnetic reproducing assembly which includes the guide means, switch means and magnetic reproducing means for the unit.

The elements contained within the enclosure 34 are best illustrated in Figures 4, 5 and 6. As shown in these figures, this portion of the assembly includes a plurality of oppositely disposed idler rollers 39, 40, 41 and 42, each of the rollers being rotatably mounted on shafts 43, 44, 45, and 46, respectively. The assembly also includes a switch member 49, a vertically movable electromagnetic head 50, a stationary pin 51, and a rubber covered friction roller 52.

To facilitate engaging the magazine unit into the magazine-receiving enclosure, the roller 42 is supported on a shaft 46 which is mounted off-center with respect to the hub of a disk 54 (Figures 1 and 5). The disk 54 has a pair of cam surfaces extending along the periphery thereof, including an upper cam surface 55 of sufficient length to extend beyond the edge of the magazine base 33, and a lower cam surface 56.

The cam surface 56 rides against a pin 58 carried by a thin sheet metal strip 59. As the disk 54 is rotated in a clockwise direction as viewed in Figure 5, the pin 58 and the strip 59 bear against the shaft carrying the rubber covered friction roller 52 and move it farther from the capstan 30. The magazine base 33 is slotted as at 60 to accommodate this lateral movement of the shaft 46 carrying the rubber covered friction roller 52. As the cam is further rotated, and the pin 58 engages the largest diameter portion, generally indicated at **56*a*, of the cam surface 56, a spring 62 having a free end 62*a* in contact with the pin 58 and its opposite end bottomed against a support 63 which supports the shaft 43, urges the pin 58 against the surface of the disk 54 beyond the cam 56. In this position, the rubber covered roller 52 is conveniently spaced from the capstan 30** so that a relatively thin magnetic recording medium can be placed therebetween.

At the same time, the shaft 46 carrying the roller 42 is mounted in an ececntric position with respect to the hub of the disk 54, so that rotation of the disk 54 will cause the shaft 46 and hence the roller 42 to move inwardly toward the magnetic reproducing head 50.

After the magazine unit with the magnetic recording medium coiled therein is placed in position on the magazine receiving assembly, rotation of the cam surface 55 in the counterclockwise direction causes the rubber-covered roller and friction roller 52 to be moved toward the capstan 30 and urge the magnetic recording medium against the capstan 30. At the same time, the roller 46 is displaced outwardly from the magnetic reproducing head 50 to tension the coiled magnetic recording medium in the magazine.

*The magazine unit*

Figure 7:
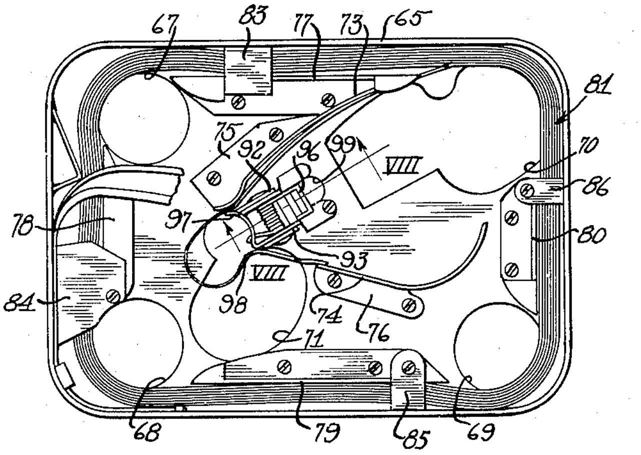
Figure 7 is a plan view of the magazine itself.

The structure of the magazine unit itself and the manner in which the recording medium is coiled within the magazine is best illustrated in Figures 4 and 7. As shown in these figures, the magazine unit is a generally rectangular open-ended container 65 which is arranged to be snugly received in nested engagement with the magazine enclosure 34. As shown in Figures 1 and 2, the magazine unit may also be provided with a removable dust cover 66 detachably secured thereto.

The base of the magazine unit is provided with suitable apertures to enable the magazine to be fitted over the driving elements and the idler rollers. As shown in Figure 7, the magazine base contains an aperture 67 to accommodate the idler roller 41, an aperture 68 to accommodate the roller 39, an aperture 69 to receive the idler roller 40 and an arcuately shaped aperture 70 to accommodate the electromagnetic head 50, the switch mechanism 49, and permit relative movement of the idler roller 42.

The base of the magazine unit is also provided with an aperture 71 to receive the capstan 30 and permit relative movement of the rubber covered friction roller 52 toward and away from the capstan 30.

Various guide members are included in the interior of the magazine to direct the magnetic record member into proper alignment with the electromagnetic head 50. As shown in Figures 4 and 7, the magazine assembly includes a pair of arcuately shaped, converging guide strips 73 and 74 fastened to the base of the magazine unit by means of brackets 75 and 76 respectively. The assembly also includes a plurality of spacer guides 77, 78, 79 and 80 along the four edges of the magazine unit to contain the magnetic record member between the spacer guides and the walls of the magazine unit.

As shown in Figures 4 and 7 the magnetic recording medium is in the form of an elongated tape 81 having a magnetically active surface on a suitable base material. Such magnetic impulse record members are, per se, well known in the art and usually comprise a uniform dispersion of high coercive force magnetic particles dispersed in a suitable binder on a non-magnetic base such as paper, cellulose acetate, or cellulose nitrate. An endless loop of such a magnetic record tape 80 is coiled against itself and inserted into the magazine unit. As shown in Figures 4 and 7, the coil of magnetic tape 81 is disposed between the various guide members so as to generally conform with the shape of the magazine container 65.

A plurality of clips 83, 84, 85 and 86 (Figure 7) are secured to the spacer guides to contain the coil of magnetic tape 81 against displacement in a vertical direction.

As shown in Figures 4 and 7, the magnetic record tape 81 is fed continuously from the inside of the coil past the magnetic reproducing head 50 and then returned to the outside of the coiled body of tape. The path of the magnetic tape through the magazine unit can be best observed from the showing in Figure 4, which shows the magazine unit in operative engagement with the drive elements of the magnetic reproducing assembly. As evident from that drawing, the tape 81 is pulled from the interior of the coiled body, at the periphery of the idler roller 42. As indicated by the arrows, the tape next passes a switch assembly 49 and then passes into operative engagement with the poles of an electromagnetic reproducing head 50. The structure of the reproducing head is, of course, well known in the art, and normally includes a ferromagnetic core having confronting pole portions defining a non-magnetic gap therebetween. The changes in magnetic flux across the gap produced by passage of the magnetized record member thereover are picked up by a pick-up coil surrounding a portion of the ferromagnetic circuit, and amplified and reproduced in a conventional sound reproducing system.

The tape 81 is pulled across the active surface of the reproducing head by the rotating capstan 30 at a substantially uniform velocity. Efficient contact between the tape member and the periphery of the capstan 30 is insured by the rubber covered friction roller 52 which urges the tape against the periphery of the capstan 30. From the periphery of the capstan 30, the tape passes along the arcuately shaped guide member 74, after which the tape forms a loop indicated at numeral 88. The tape is returned to the outer periphery of the coil by passage through a channeling member 89 having its marginal edges turned inwardly to define a guide channel for the passage of the tape. As shown in Figure 4, the channeling member 89 has attached to it a resilient spring member 90 which closes the loop 88 and guides the tape into the channel formed in the channeling member 89.

Figure 8:
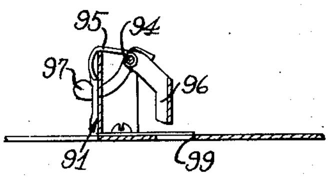
Figure 8 is a cross-sectional view taken substantially along the line VIII—VIII of Figure 7 illustrating more particularly the latch means shown therein.

In order to insure that the tape will be properly looped for engagement about the capstan, the mechanism illustrated in Figures 7 and 8 is provided. As shown in these figures, a bracket 91 having a pair of oppositely disposed wall portions 92 and 93 is secured to the base of the magazine unit. The wall portions 92 and 93 support a pin 94 having a spring 95 coiled thereabout. Pivotally mounted about the pin 94 is an assembly including an angle arm 96 having a pair of oppositely disposed outwardly tapered ears 97 and 98 which extend through suitable slots provided in the bracket 91. The oppositely disposed ears 97 and 98 are urged through the slots in the bracket 91 by the action of the spring 95 and, as shown in Figure 7, urge the magnetic tape outwardly to form a relatively small diameter loop of sufficient width to enclose the capstan 30. As best shown in Figure 8, the angle arm 96 extends over an aperture 99 in the base of the magazine unit through which the pointed pin 51 is arranged to protrude. Thus, as the magazine assembly of Figure 7 is fitted into the magazine enclosure 34 of Figure 6, the pin 51 engages the angle arm 96 and retracts the ears 97 and 98 through the slots provided in the bracket 91. The loop formed in the magnetic tape is then capable of being pulled against the periphery of the capstan 30. Conversely, as the magazine unit is lifted from the drive elements, the spring 95 urges the ears 97 and 98 outwardly to hold the loop in fixed position against the ends of the guide members 73 and 74.

*The magnetic tape*

Figure 9:
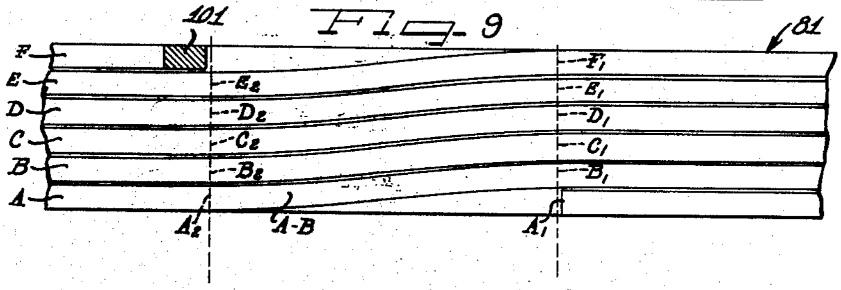
Figure 9 is a fragmentary view of the improved record member of the present invention.

One of the features of the present invention resides in the orientation of the recorded tracks on the endless loop magnetic tape 81. For purposes of illustration, the record member of Figure 9 is shown as including six recorded channels, labeled A through F, inclusive. It will be appreciated that the various recorded channels are invisible to the eye, but the channels have been delineated by the spaced lines of Figure 9 for purposes of clarity. As shown in this drawing, the first channel, A, is recorded beginning with a point identified as $A_1$, in parallel relation to the marginal edges of the magnetic record member. The end of the recording on channel A will occur at a point on the endless loop tape member 81 indicated generally at numeral $A_2$. In order that the transition from one channel, such as channel A to the next adjacent channel, channel B, be smooth and continuous without interruption of the reproduction of the recorded intelligence, the intelligence is recorded on the magnetic tape along an angularly disposed transition track labeled A—B. Since means which will be hereinafter described are provided for moving the electromagnetic recording head in a direction substantially transverse to the direction of movement of the tape, while the tape is moving continuously, the electromagnetic recording head will engage the angularly disposed transition track A—B while the electromagnetic reproducing head moves from the end of track A, at $A_2$ to the beginning of track B, identified as $B_1$. Similarly, other angularly disposed transition tracks are provided to connect the end of one recorded channel to the beginning of the next recorded channel. The transition tracks will preferably have a length corresponding to a playing time of 1 to 10 seconds although shorter or longer intervals may be used. The preferred rate of lateral movement of the head is slow enough to prevent any detrimental effect on the recorded matter, and yet does not provide problems of synchronization of the head with the track, as would occur with a helically formed track.

The advantage of the system described above is that a relatively long uninterrupted recording time can be achieved with a relatively small recording medium and a small magazine unit. For example, six recorded channels can be conveniently accommodated upon a magnetic record tape one-half inch in width. An endless loop of the tape sufficient to give a recording time of about three to four minutes on each channel can easily be contained in the magazine structure measuring 3 by 5 inches. Thus, a compact magazine unit of these dimensions can be used to reproduce continuously a program of music of eighteen to twenty-four minutes duration. Of course, the magnetic tape can also be recorded with six individual programs each of three to four minutes duration, in which case the transition tracks such as track A—B might not have any intelligence recorded thereon. Further, tapes of varying widths and varying numbers of channels can be accommodated in interchangeable magazines.

As shown in Figure 9, the magnetic record tape of the present invention also includes a short strip 101 of electrically conductive material disposed at the end of one of the channels, such as at the end of channel F.

The strip 101 may be applied in any manner, as by painting on a small area of silver paint over the selected area. During the passage of the record tape 81 past the reproducing head 50, the strip 101 will contact and close the switch 49 and operate, through a relay-controlled mechanism, to shift the position of the reproducing head 50 from one channel to another.

*Head moving mechanism*

As best shown in Figure 6, the switch assembly 49 includes a switch mounting 102 carrying a pair of spaced switch contacts 103 and 104. The contacts 103 and 104 are electrically insulated from each other as well as from the mounting 102. As the magnetic tape 81 passes the reproducing head 50 near the end of a given channel, the electrically conductive strip 101 bridges the space between the contacts 103 and 104 to short circuit the contacts together. The contacts 103 and 104 are in series connection with an energizing lead to a relay 105 (Figure 3) having an energizing coil 106. A relay arm 107 is biased in a normally open position by means of a helical spring 108 and, at the time the strip 101 bridges the contacts 102 and 103, the momentary energization of the relay 105 causes the arm 107 to move toward the core 109 of the energizing coil 106. This momentary closing of the relay is sufficient to bring the mechanical system for shifting the reproducing head 50 into operation, as will be hereinafter described.

As best seen in Figure 3, one end of the relay arm 107 carries a slightly curved rod 110 which initiates operation of the reproducing head raising mechanism.

Concentric with the shaft 26 of the capstan and flywheel assembly is a loosely fitting collar 111. As best seen in Figure 1, the collar 111 contains two axially spaced flange portions 112 and 113. A bolt 115 (Figure 3) pivotally supports a lever 116 between the flange portions 112 and 113 of collar 111. The lever 116 is milled to provide a threaded portion 117 having the same pitch as the threaded portion 27 of the shaft 26. The lever 116 also carries a pin 118 extending therethrough, the lower end of the pin engaging an undulating spring 119 secured to collar 111 to hold the lever 116 in disengaged position as illustrated in Figure 3, or in engaged position with the threaded portion 27 of the shaft 26, with a detent action in each position. Thus, as the relay 105 is energized, the arm 110 engages the lever 116 to pivot the lever about the bolt 115. The threaded portion 117 of lever 116 then engages the threaded portion 27 of shaft 26 and causes the collar 111 to ride upwardly on the rotating threaded shaft 26. To keep the collar 111 from rotating with the shaft, a rod 120 is threaded into the upper flange member 112 of collar 111. An end of the rod 120 extends through a guide bracket 121 (Figure 2) having a slot 122 therein to accommodate movement of the rod 120 in a vertical direction.

The collar 111 also carries a depending support arm to which an end of a first lever arm 123 is pivotally secured. The lever arm 123 is also pivoted by means of a pin 124 extending through a bifurcated portion 125 of a support rod 126 (Figure 2). The opposite end of the lever 123 is free to pivot about a pin 127, the latter being supported by means of a helical spring 128 having one end trained about a sleeve 130 (Figure 3) about the pin 127 and its opposite end fixed within a suitable recess in the platform 29.

As the collar 111 rides up on the shaft 27, the lever 123 is pivoted about the fulcrum provided by the pin 124. The result is a slight downward movement in the pin 127 carrying the end of the lever 123.

The pin 127 also pivotally supports an end of a second lever arm 131. The fulcrum for the second lever arm is provided by a pin 132 carried by a supporting bracket 133 secured to the base 12. The extreme end of the second lever arm 131 is secured to a helical spring 134 which has one end bottomed on the base 12.

The second lever arm 131 carries a pawl or dog 135, the latter being free to pivot about a pin 136 (Figure 2) carried by the lever arm 131. A coiled spring 137 urges the dog 135 into engagement with an indexing mechanism which determines the extent of movement of the reproducing head 50.

As best seen in Figures 1 and 2, the electromagnetic reproducing head 50 is supported on a hollow shaft 140, the latter being provided with a threaded ratchet portion 141. The energizing leads for the electromagnetic head 50 are contained within the hollow portion of the shaft 140. As the second lever arm 131 is pivoted about the fulcrum provided by pin 132, the dog 135 is urged into engagement with the threaded ratchet portion 141 to raise the shaft 140 carrying the electromagnetic head 50 a predetermined amount. The reproducing head 50 is thus moved vertically in a direction substantially transverse to the direction of movement of the magnetic tape 81 across the active portion of the reproducing head 50. During this time, the electromagnetic head is in contact with one of the transition channels between the recorded channels on the tape 81, and reproduces any intelligence previously recorded thereon.

To prevent slight rotary movement of the head 50 by engagement of the dog 135 with the axially threaded ratchet portion 141, the shaft 140 is provided with a collar 142, and the collar 142 carries a rod 143 (Figure 1). The free end of the rod 134 extends through a slotted guide bracket 144 as shown in Figures 1 and 3 to permit vertical movement of the shaft 140 while restraining rotational movement.

A second dog 146 is pivotally supported on a pin 147 carried by a supporting bracket 148. A relatively stiff spring member 149 urges the end of the dog 146 into engagement with the threaded ratchet 141 to hold the threaded ratchet 141 in fixed position after each indexing operation by the first dog 135.

The release means for terminating the indexing operation are best shown in Figures 1 and 3. As shown in these figures, the shaft 26 has a collar 150 secured thereto by means of a threaded set screw 151. The collar 150 carries a pin 152. As the collar 112 rides upwardly on the threaded portion 27, due to the engagement of the lever 116 with the threaded portion 27, the collar 112 will ride upwardly until the pin 152 extending from collar 150, and rotating with the shaft 26, strikes the pin 118 secured to the arm 116. As this occurs, the arm 116 is pivoted about the bolt 115 and disengages the threaded portion 117 from the threaded portion 27 of the shaft 26. The undulating spring 119 is suitably crimped to lock the lower end of the pin 118 extending beyond the arm 116 in its disengaged position. The collar 111 is thereupon free to drop by gravity back to its original position shown in Figure 1 disengaged from the threaded position 27 of the shaft 26.

*Operation*

To recapitulate the operation of the device of the present invention, the recording mechanism operates continuously with the electromagnetic reproducing head 50 in engagement with one of the recorded channels, for example, channel A of the magnetic tape 81 until the end of the given recorded channel is approached. At that time, the electrically conductive strip 101 bridges the contacts of the switch assembly 49 and thereby energizes the relay coil 106. Momentary closure of the relay causes the arm 110 to strike the lever 116 and engage the threaded portion 17 of lever 116 with the threaded portion 27 of shaft 26. After engagement, the collar 111 rides upwardly on the shaft 27. As relative movement occurs between the collar 111 and the shaft 26, the first lever arm 123 pivots about its fulcrum defined at pin 124. This motion, in turn, pivots the second lever arm 131 about its pivot defined by the pin 132. Movement of the second lever arm 132 about its pivotal axis causes the dog 135 to engage the threaded ratchet 141 between the teeth of the ratchet, and move the shaft 140 carrying the ratchet 141 and the electromagnetic recording head 50 upwardly. The electromagnetic reproducing head 50 thus moves in a direction transverse to the direction of movement of the magnetic record tape 81 and at the time of its movement is in contact with one of the angularly disposed transition tracks such as A—B. The head is continuously moved until such time as the collar 111 is advanced up the threaded shaft 26 so that the rotating pin 152 can strike the pin 118 on the collar and disengage the collar from the threaded shaft. The second dog 146 is then effective in holding the electromagnetic head 50 in its new position to reproduce intelligence from channel B.

The preceding discussion has dealt primarily with magnetic reproducing assemblies. The system of the present invention can also be employed in a recording assembly to record initially the intelligence in the manner illustrated in Figure 9 of the drawings. In such case, the electrical system of the electromagnetic head would also include a source of high frequency bias as explained in my previously issued Patent No. 2,351,004. An erase head can also be included in the same assembly. In this specification and claims the phrases "transducer head" or simply "head" are used to denote an electromagnetic head having one or more of these functions.

An indexing mechanism can also be provided with the magnetic recording and reproducing assemblies of the present invention for the purpose of indicating the channel being played. Such an indexing mechanim can also include elements for completely de-energizing the assembly at the completion of the last channel, or for returning the electromagnetic head to association with the first channel at the completion of the last channel and thereby provide continuous replaying of each of the channels. A suitable mechanism for accomplishing these functions is illustrated in the drawings on Figures 10 to 14, inclusive.

As shown on these figures, the magnetic reproducing assembly of the previous drawings can be modified by including a pair of pivotally mounted dogs 160 and 161 arranged in side by side parallel relationship, each of the dogs having a coiled spring 162 and 163, respectively, (Fig. 13) urging the tapered ends of the dog into engagement with the threaded ratchet portion 141 on the shaft 140 which carries the electromagnetic head 50. In this embodiment of the invention, as in the embodiments previously described, the pivotal movement of the lever 131, actuated by movement of the collar 111 on the shaft 26, causes the dog 160 to raise the head 50 to the next magnetically recorded channel on the magnetic tape. Thus, the ratchet moving dog 160 is carried by the lever arm 131, while the second dog 161 is carried on the stationary bracket 165 secured to the platform 29.

Figures 10, 11, 12, 13, 14:
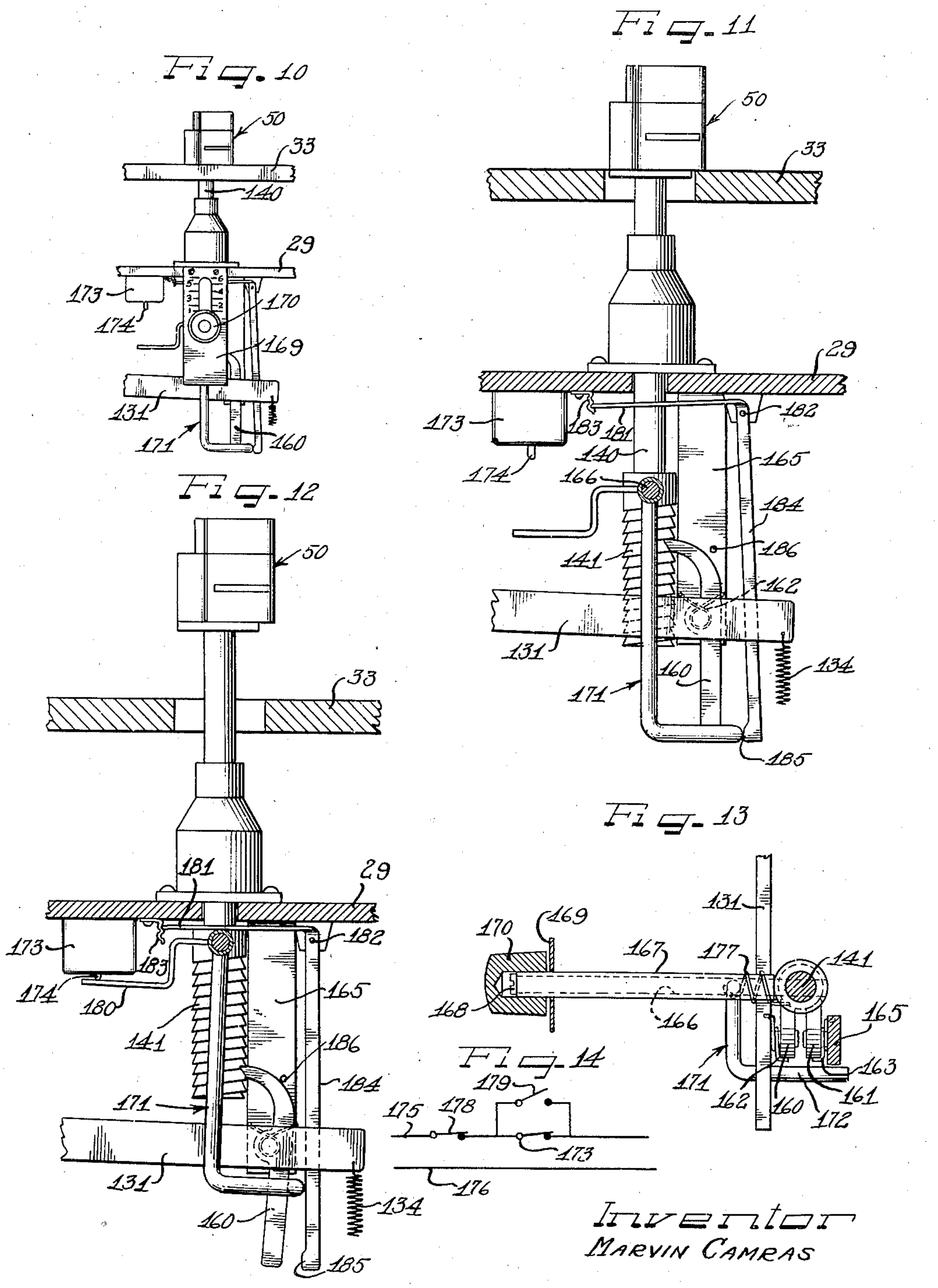
Figure 10 is a fragmentary view in elevation illustrating an indexing mechanism which can be employed with the assembly of the present invention.
Figure 11 is an enlarged view of the assembly of Figure 10, with portions removed to illustrate the indexing mechanism more clearly.
Figure 12 is a view similar to Figure 11, but illustrating the position of the indexing mechanism at the completion of the last recorded channel on the magnetic tape.
Figure 13 is a plan view of the indexing mechanism.
Figure 14 is a schematic circuit diagram illustrating the switching arrangement used in conjunction with the indexing mechanism.

As best shown in Figure 13, the indexing mechanism includes a rod 166 which is fixedly secured to the shaft 140. A sleeve 167 concentric with the rod 166 is freely rotatable about the shaft 140, and is restrained from axial movement along the rod 166 by a nut 168 threaded into the end of the rod 166. The rod 166 and the sleeve 167 extend through an indexing bracket 169 which forms a part of the front panel of the magnetic reproducing assembly. As shown in Figure 10, the indexing bracket 169 contains a plurality of numbers corresponding to the number of channels on the magnetic tape member for indicating which of the channels is being reproduced by the electromagnetic head.

A knob 170 is press fitted on the end of the sleeve 167 for rotation thereof with respect to the rod 166 against the action of a spring 177 which resists relative rotative movement of the two members.

The sleeve 167 also carries a bent actuating rod 171 having an end portion 172 (Fig. 13) arranged to engage both dogs 160 and 161 to release the dogs from engagement with the threaded portion 141 of the shaft 140. Rotation of the knob 170 in a clockwise direction as seen in Figure 10 causes the end portion 172 to release the dogs from engagement, and permit manual vertical movement of the electromagnetic head 50 to any desired channel, and bring the top of the knob 170 into registry with different indicia on the bracket 169.

The embodiment of the invention illustrated in Figures 10–14 is arranged for either continuous operation in which the reproducing assembly continuously reproduces all the channels on the magnetic record member, in succession, and then repeats the reproduction starting with the first channel, and is also arranged to deenergize the entire reproducing assembly at the completion of the last channel on a given tape. For the latter purpose, a switch 173 having an operating button 174 extending therefrom is provided. The operating button 174 is arranged to be contacted by the actuating mechanism prior to the time that the mechanism contacts the elements which provide for continuous replay, as will hereinafter be described.

A portion of the electrical circuit which includes the switch 173 is indicated schematically in Figure 14. As shown on that drawing, two energizing leads 175 and 176 supply the electrical energy to the reproducing assembly, including the motor, amplifier, and other electrically energized components of the assembly. An on-off switch 178 controls the energization of these electrical circuits from the lines 175 and 176. A second switch, 179, is in series with the main on-off switch 178 and is controlled from the front panel of the magnetic reproducing assembly. When this switch 179 is in its open position, as illustrated in Figure 14, the apparatus is arranged to be deenergized upon reproduction of the last channel on the magnetic record member. The switch 173 is also in series with the main on-off switch 178, and is normally in a closed position, so that current flows from the energizing lines 175 and 176 into the components of the assembly. When, however, the last channel on the magnetic record tape has been played, and the electromagnetic head has been raised to its uppermost position as indicated in Figure 12, a bent actuating arm 180 carried by the sleeve 167 engages the operating button 174 and opens the switch 173. When the switch 173 is open, the circuit is broken to the motor and amplifier, and the assembly is completely deenergized.

When it is desired to replay the channels in a continuous manner, the switch 179 is closed, making the energization of the system independent of the condition of the switch 173. In this condition, the electromagnetic head 50 is progressively advanced to reproduce each of the channels on the magnetic record tape, and after the last channel is completed, the sleeve 167 contacts an arm 181 of a lever assembly pivoted as indicated at 182. Before the sleeve 167 contacts the arm 181, it necessarily operates the switch 173 by means of arm 180, but since this switch is shorted out by the closed switch 179, no electrical circuits are broken.

While the electromagnetic head 50 is reproducing successively the various channels on the magnetic record medium, the arm 181 is held in position by means of a detent member 183 having two detent positions. When the last channel has been played, the electromagnetic head has been moved to the position illustrated in Figure 12, and in this condition, the sleeve 167 contacts the arm 181 and moves it from the lower detent position to the upper detent position illustrated in Figure 12. Movement of the arm 181 causes the lever assembly to be pivoted about the pin 182 thereby urging a second lever arm 184 integral with the arm 181 inwardly to engage the end portion 172 of the rod 171 and thereby disengage both dogs 160 and 161 from the threaded portion 141 of the shaft 140. A stop pin 186 limits the amount of movement of the dog 160. The shaft 140 carrying the electromagnetic head 50 then drops by gravity into position to reproduce the first recorded channel as illustrated in Fig. 11. The end portion 172 then contacts a projection 185 on the arm 184 thus returning the arm 181 to its lower detent position, and causing the springs 162 and 163 to urge the dogs 160 and 161 into engagement with the threaded portion 141. The reproducing assembly is then in position to repeat the reproduction of the channels on the magnetic record tape, commencing with the first channel.

It will be understood that modifications and variations may be effected without departing from the scope of the novel concepts of the present invention.

I claim as my invention:

1. In a magnetic sound reproducing apparatus, a frame, a tape magazine supporting unit carried by said frame, an electromagnetic transducer head projecting into said supporting unit, a capstan in said unit for driving a magnetic tape across said head, means for driving said capstan, a switch in said unit along the path of movement of said tape, said switch being arranged to be energized by switch-closing means on said tape, a relay carried by said frame and energized by said switch, a threaded element extending from said capstan, a collar engageable with said threaded element, an arm movable by operation of said relay to engage said collar with said threaded element to move said collar axially along said threaded element, a ratchet element carrying said head, a pair of pivoted levers, means on the end of one of said levers securing said one lever to said collar, a dog carried by the other of said levers engaging said ratchet element to lift said head a predetermined amount, means rotatable with said capstan to disengage said collar from said threaded element after said head has been lifted a predetermined amount, and means pivotally mounted on said ratchet element to disengage said dog from said ratchet element.

2. A magnetic sound reproducing assembly comprising a frame, support means for holding a magazine unit on said frame, a plurality of spaced idler rollers extending from said frame, a movable electromagnetic transducer head carried by said frame, a capstan carried by said frame, means for driving said capstan, a magazine unit detachably secured to said support means, an elongated magnetic recording medium having a plurality of spaced recorded channels thereon, means in said magazine confining said medium into a loop, said magazine unit having spaced apertures therein to permit mounting said magazine on said frame with said idler rollers within the loop of said medium and with said head in contact with a portion of said tape, a switch in the path of movement of said medium across said head, switch-operating means carried by said tape, and means operable by the closing of such switch by said switch operating means to move said head in a direction substantially transverse to the direction of movement of said medium across said head from one recorded channel to the next adjacent channel.

3. A magnetic sound reproducing assembly comprising a frame, support means for holding a magazine unit on said frame, a plurality of spaced idler rollers extending from said frame, a movable electromagnetic transducer head carried by said frame, a capstan carried by said frame, means for driving said capstan, a magazine unit detachably secured to said support means, an elongated magnetic recording medium having a plurality of spaced channels thereon, said channels being in spaced parallel relation and having an angularly disposed track at the end of each channel connecting one channel with the next adjacent channel, means in said magazine confining said medium into a loop, said magazine unit having spaced apertures therein to permit mounting said magazine on said frame with said idler rollers within the loop of said medium and with said head in contact with a portion of said tape, a switch in the path of movement of said medium across said head, switch-operating means carried by said tape, and means operable by the closing of said switch by said switch operating means to move said head in a direction substantially transverse to the direction of movement of said medium across said head from one recorded channel to the next adjacent channel while said head is in contact with one of the angularly disposed tracks.

4. A magnetic sound reproducing assembly comprising a frame, support means for holding a magazine unit on said frame, a plurality of spaced idler rollers extending from said frame and arranged to define a loop, a movable electromagnetic transducer head carried by said frame, a capstan carried by said frame and disposed within the loop defined by said idler rollers, means for driving said capstan, a friction roller carried by said frame, means for relatively moving said capstan and said friction roller to engage the medium therebetween for driving said medium, and releasable clamping means in said magazine unit and disposed within the loop defined by said idler rollers for holding said medium to thread between said capstan and friction roll during assembly of the magazine unit with the support means.

5. A magnetic sound reproducing assembly comprising a frame, support means for holding a magazine unit on said frame, a plurality of spaced idler rollers extending from said frame and arranged to define a loop, a movable electromagnetic transducer head carried by said frame, a capstan carried by said frame and disposed within the loop defined by said idler rollers, means for driving said capstan, a friction roller carried by said frame, means for relatively moving said capstan and said friction rollers to engage the medium therebetween for driving said medium, and means in said magazine unit for holding said medium to thread between said capstan and friction roll during assembly of the magazine unit with the support means, said holding means including a pair of opposed clamps for clamping said medium in the form of a loop upon detachment of the magazine unit from the support means, and for releasing said medium upon assembly of the magazine unit with said support means.

6. A magazine unit for magnetic reproducing assemblies including a receptacle, a length of magnetic recording tape in the form of an endless coil held within said receptacle and means for holding a first portion of the tape in the form of a loop to accommodate driving means therefor, said holding means including a spaced pair of clamping members for clamping respective second portions of said tape on either side of said first portion when the receptacle is disassembled from a magnetic reproducing assembly, and for releasing said second portions of said tape when the receptacle is assembled with a reproducing assembly.

7. In a magnetic transducer apparatus: a frame; a magazine receiving enclosure projecting from said frame; a plurality of idler rollers mounted by said frame within said enclosure and defining a loop; an electromagnetic transducer head mounted by said frame within said enclosure and within said loop; a capstan projecting into said enclosure within said loop; a pinch roll projecting into said enclosure within said loop; means connected with said pinch roll and with at least one of said idler rollers for moving the pinch roll away from said capstan and to move said idler roller to reduce the perimeter of said loop; a magazine unit comprising a container in snug nested detachable engagement with said enclosure; said container having a base with a plurality of spaced apertures receiving said idler rollers, said electromagnetic head, said capstan and said pinch roll and affording movement of said pinch roll and said one idler roller; a magnetic record tape in said container having a major portion thereof defining a loop around said idler rollers and being in the form of an endless coil; first and second guide strips carried by said container; said first guide strip guiding a portion of said tape from said head to said capstan; said second guide strip guiding said tape as it is delivered from said capstan; a portion of the tape extending from the inside of the tape loop past the magnetic transducer head then along said first guide strip, around said capstan drive and between said capstan and said pinch roll, along said second guide strip, and then generally reversely and across the tape loop to the outer side of the tape loop; a pair of clamps mounted for pivotal movement in said container from a clamping position clamping the tape against said first and second guide strips respectively to form a capstan tape loop encircling the aperture in the container base receiving the capstan to a release position accommodating pulling of the capstan loop against the periphery of the capstan; spring means carried by the container urging said clamps toward clamping position; and a member carried by said frame and projecting into said enclosure and projecting through an aperture in said base and pivoting said clamps to release position while said container is nested in said enclosure.

8. A magnetic transducer assembly comprising a frame, support means for holding a magazine unit on said frame, an electromagnetic transducer head carried by said frame, a capstan carried by said frame, means for driving said capstan, a magazine unit detachably secured to said support means, an elongated magnetic record medium, means in said magazine unit confining said medium for travel past said transducer head, means within said magazine unit for clamping said medium for retaining the medium in configuration for accommodating said capstan, and means carried by said frame for projecting into said magazine unit and cooperating with said clamping means to release said clamping means while the magazine is secured to said support means.

9. In a magnetic transducer apparatus, a frame, a means for mounting an endless loop of magnetic tape on said frame, a magnetic transducer head for cooperating with said tape, means for moving the tape past said head, means actuated by said moving means for moving said head incrementally in a direction substantially transverse to the direction of said movement of said tape, said actuated means comprising screw thread means continuously driven with said tape moving means, a nut cooperable with said screw thread means and movable into engagement with said screw thread means for moving said head transverse to the direction of movement of said tape, a ratchet portion connected with said transducer head, and a dog operably connected with said nut and operable to engage said ratchet portion and move the same upwardly in incremental steps upon movement of said nut into engagement with said screw thread means.

References Cited in the file of this patent

UNITED STATES PATENTS

| | | |
|---|---|---|
| 2,232,486 | Smith | Feb. 18, 1941 |
| 2,255,724 | Sunnell | Sept. 9, 1941 |
| 2,259,631 | Flood | Oct. 21, 1941 |
| 2,311,383 | Hardenberg | Feb. 16, 1943 |
| 2,323,215 | Gilman | June 29, 1943 |
| 2,325,563 | Westerkamp | July 27, 1943 |
| 2,364,556 | Somers | Dec. 5, 1944 |
| 2,468,198 | Heller | Apr. 26, 1949 |
| 2,551,198 | Barrett | May 1, 1951 |
| 2,568,681 | Kuhlik | Sept. 18, 1951 |
| 2,568,734 | Heyer | Sept. 25, 1951 |
| 2,586,666 | Kuhlik | Feb. 19, 1952 |
| 2,631,034 | Eddy | Mar. 10, 1953 |
| 2,653,819 | Roberts | Sept. 29, 1953 |
| 2,668,059 | Roberts | Feb. 2, 1954 |
| 2,676,022 | Roberts | Apr. 20, 1954 |
| 2,701,718 | Allen | Feb. 8, 1955 |

FOREIGN PATENTS

| | | |
|---|---|---|
| 633,160 | Germany | July 21, 1936 |